Oct. 9, 1928.　　　　　　　1,687,455
F. A. KLEIN
AUTOSLEIGH
Filed Dec. 26, 1922　　　4 Sheets-Sheet 1
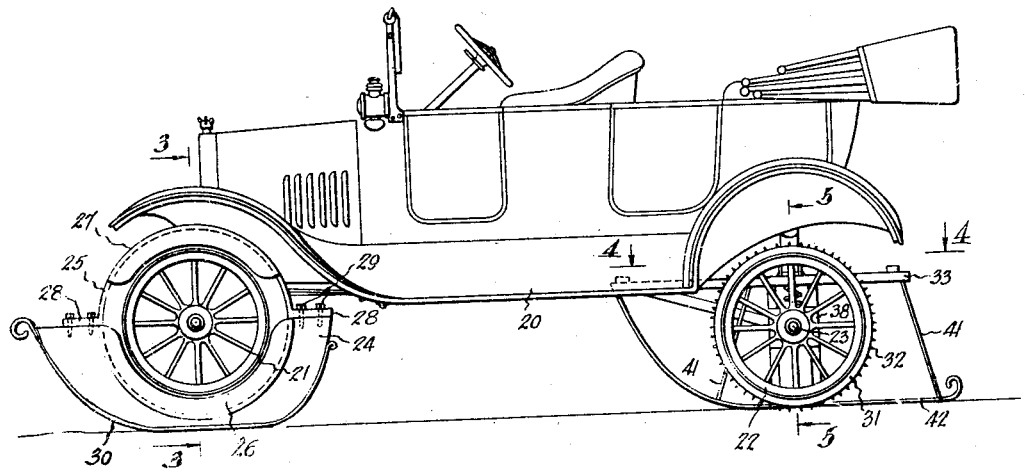
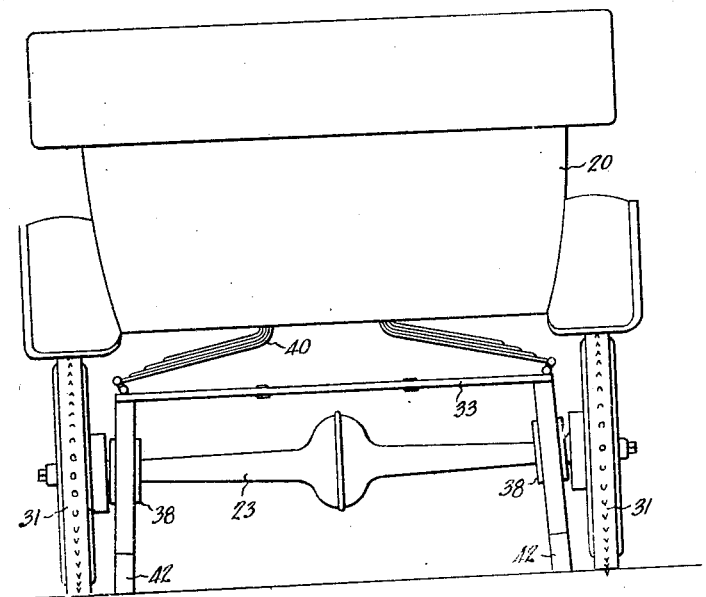
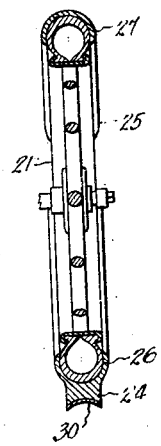
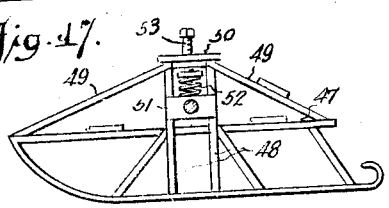
INVENTOR
FRANCIS ALBERT KLEIN,
BY
ATTORNEYS Oct. 9, 1928.  
F. A. KLEIN  
1,687,455  
AUTOSLEIGH  
Filed Dec. 26, 1922  
4 Sheets-Sheet 2

WITNESSES

INVENTOR  
FRANCIS ALBERT KLEIN.  
BY  
ATTORNEYS

Oct. 9, 1928.
F. A. KLEIN
1,687,455
AUTOSLEIGH
Filed Dec. 26, 1922
4 Sheets-Sheet 3
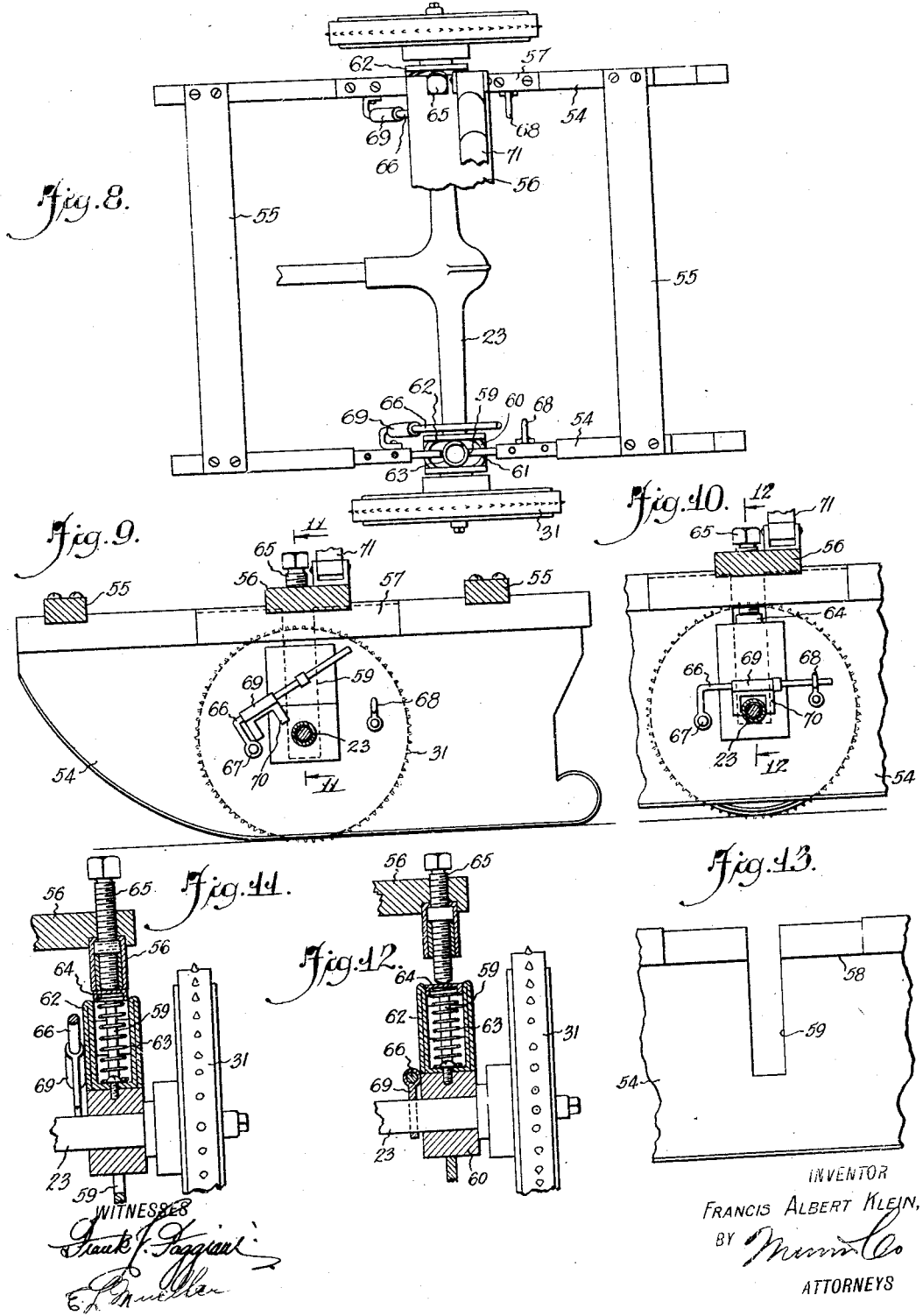

Oct. 9, 1928.

F. A. KLEIN 1,687,455

AUTOSLEIGH

Filed Dec. 26, 1922  4 Sheets-Sheet 4

INVENTOR
FRANCIS ALBERT KLEIN,
BY
ATTORNEYS

Patented Oct. 9, 1928.

1,687,455

UNITED STATES PATENT OFFICE.

FRANCIS ALBERT KLEIN, OF XENIA, OHIO.

AUTOSLEIGH.

Application filed December 26, 1922. Serial No. 608,982.

This invention relates to improvements in motor vehicles and has for one of its objects to provide improved means for facilitating the travel of the vehicle over snow and ice covered surfaces.

Another object is to provide runners for the vehicle which are so supported with respect to the wheels thereof that the latter will have a yieldable vertical movement relative to said runners when traveling over rough surfaces.

A further object is to provide a novel adjustment for certain of the runners whereby the same may be permanently elevated with respect to the wheels of the vehicle and held in an elevated position out of contact with the surface over which the vehicle is traveling.

A still further object is to so construct the runners that certain of them may be readily attached to the vehicle and others to certain of the wheels thereof.

The above and other objects will appear more clearly from the following detail description, when taken in connection with the accompanying drawings, which illustrate several embodiments of the inventive idea.

In the drawings—

Figure 1 is a side elevation of a motor vehicle showing one form of the invention applied thereto;

Figure 2 is a rear elevation thereof;

Figure 3 is a section on the line 3—3 of Figure 1;

Figure 8 is a fragmentary top plan view of another form of rear runner;

Figure 9 is a longitudinal section of the runner illustrated in Figure 8 showing the runner and adjacent rear wheel in engagement with the ground;

Figure 10 is a view similar to Figure 9 illustrating the manner in which the runner is elevated with respect to the wheel and maintained in such position;

Figure 11 is a sectional view on the line 11—11 of Figure 9;

Figure 12 is a similar view on the line 12—12 of Figure 10;

Figure 13 is a fragmentary side elevation of the runner shown in Figure 9 detached from the rear axle of the vehicle and with associated parts removed;

Figure 17 is a side elevation of another form of rear runner somewhat similar in construction to that shown in Figure 1.

Figure 4:
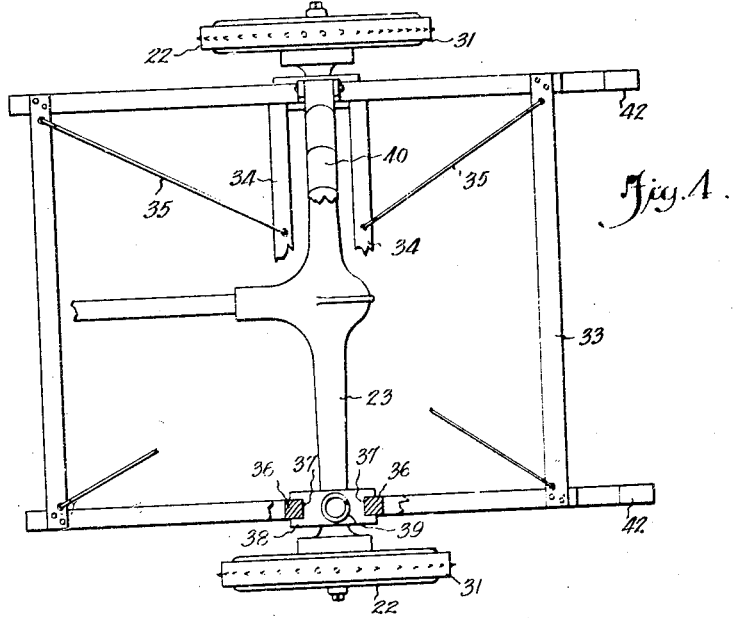
Figure 4 is a section on the line 4—4 of Figure 1.

Referring to the drawings, and more particularly to Figures 1 to 5 inclusive, the numeral 20 indicates a motor vehicle of any desired construction and including the front wheels 21 and rear wheels 22, the latter of which are supported by the rear axle housing 23 in any well known manner.

Each front wheel 21 is provided with a runner that is so constructed as to enable the same to be applied to the wheel without removing the pneumatic tire therefrom. The runner includes the lower and upper sections 24 and 25, both of which are of substantially arcuate formation and provided with tire engaging portions 26 and 27, respectively, which partially embrace the tire of the front wheel, as clearly illustrated in Figures 1 and 3. The upper section 25 is provided with oppositely disposed flanges 28, which engage the upper portion of the lower section 24 to which said upper section is detachably secured by means of bolts or other fastening devices 29. The sections of this forward runner may be made of wood, or any other desirable material and the lower section 24 is provided with the concaved metallic tread member 30. By this construction it will be apparent that the forward runners may be readily and quickly attached to and detached from the front wheels.

Figure 5:
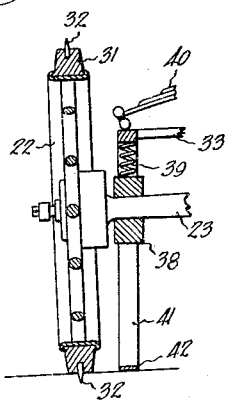
Figure 5 is a section on the line 5—5 of Figure 1.

In carrying out the invention, it is preferable that the tires for the rear wheels 22 be removed and in their place a tread member 31 for each wheel provided, which is mounted upon the rim of the wheel, as shown in Figure 5, and which is provided about its periphery with a plurality of spurs 32, which facilitate the travel of the vehicle over slippery surfaces. Associated with the rear wheels 22 and axle housing 23 is a rear runner including an upper frame 33 of rectangular formation having transverse braces 34 joining the side members of the frame, said braces being connected to the end members of said frame by means of the rods 35, so as to form a rigid structure. The runner further includes the intermediate vertical members 36, which engage in oppositely disposed grooves 37 formed in a block 38 carried by the axle housing adjacent each end thereof, said members 36 and block 38 cooperating to provide a guide which permits of vertical movement of the rear wheel 22 and axle housing 23 with respect to the rear runner when said wheels are passing over rough surfaces. In order that the vertical movements of the wheels thus occasioned will not be transmitted to the frame of the runner, coil springs 39 are interposed between the blocks 38 and said frame and to which frame the underside of the body 20 is connected by the usual leaf springs 40, as shown in Figure 2. The runner further includes the vertical braces 41, which have secured to the lower ends thereof the tread members 42 arranged inwardly of the rear wheels.

Figure 6:
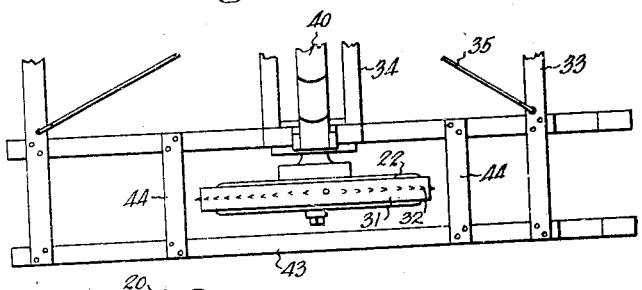
Figure 6 is a fragmentary view similar to Figure 4 showing a slightly different form of rear runner.
Figure 7:
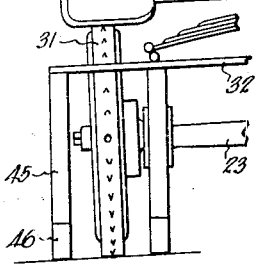
Figure 7 is a fragmentary rear elevation of the runner illustrated in Figure 6.

In the embodiment illustrated in Figure 6, the construction of the rear runner is practically the same as that described in Figure 4, with the exception that the end members of the frame 33 are extended beyond the wheels 22 and carry auxiliary side members 43 additionally supported by means of braces 44 and having depending therefrom vertical braces 45 carrying tread members 46 at the lower ends thereof, which are disposed outwardly of the adjacent rear wheel, thus providing four sets of tread members instead of two.

The rear runner illustrated in Figure 17 is substantially the same as that already described, except that the frame 47 thereof is arranged closer to the ground and the guide members 48 which are similar to the members 36 extend above said frame and are joined thereto by the diagonal braces 49 and the transverse brace 50. The block 51 which is similar to the block 38 and through which the axle housing extends has interposed therebetween and the transverse brace 50 the spring 52, which is equivalent to the spring 39 and the tension of which may be regulated by means of a bolt or other device 53.

Referring now to Figures 8 to 13 inclusive, the rear runner is shown as including a pair of side members 54, which are preferably made of metal and joined at their front and rear ends by the cross braces 55 and intermediate their ends by the brace 56. This brace 56 is detachably mounted upon the upper edge of each member 54 by means of the channel members 57 which receive the upper edge of the adjacent side member, the latter being cut away or reduced, as indicated at 58, for the purpose. At a point in substantial vertical alignment with the intermediate brace 56 each side member 54 is provided with a vertically arranged slot 59 terminating at the upper edge of the member and adapted to receive the axle housing 23, as clearly shown in Figures 9 and 10. A block 60 is carried by each end of the axle housing 23 and is provided with vertical grooves 61 (see Figure 8) for receiving the portions of the adjacent side member 54 forming the vertical edges of the slot 59. Secured to the upper end of the block 60 is a metallic housing 62 in which is mounted a coil spring 63, the upper end of which bears against a plate 64, which is movable vertically in the housing, said spring and plate combining to form a yieldable support for the side members 54 forming a part of the runner. As in the constructions previously described, the rear wheels and axle housing 23 will have a vertical movement with respect to the members 54 constituting the rear runner against the tension of the springs 63 when the wheels are traveling over rough surfaces.

Means are provided for elevating the rear runner when it is not desired to use the same and to maintain the side members 54 of said runner in an elevated position. This means preferably includes a screw member 65 adjustably mounted in each end of the intermediate brace 56 and having its lower end engageable with the adjacent plate 64. When the side members 54 are in engagement with the ground the parts are as shown in Figures 9 and 11 and by turning the screw member 65 in a clockwise direction the same is forced downwardly against the tension of the spring 63 until this spring is compressed sufficiently to overcome the weight of the runner, whereupon further turning of the screw member 65 will cause the intermediate brace 56 and consequently the remaining parts of the runner to be elevated, as shown in Figures 10 and 12, with the side members 54 out of contact with the ground. In order to lock the runner in its elevated position, a lever 66 is pivoted to each side member 54, as indicated at 67, and the free end of said lever is swung to engage a hook 68, also carried by the side member, as illustrated in Figure 10. A latching plate 69 slidably and pivotally mounted on each lever 66 and provided with a recess 70 for receiving the axle housing 23 is then swung to the position shown in Figure 10 and when in this position will support the side members 54 of the runner upon the axle housing and thus prevent any downward movement of said members 54.

In the embodiment just described the rear runner is connected to the body of the vehicle by the usual leaf springs 71 connected at their ends to the brace 56.

Figure 14:
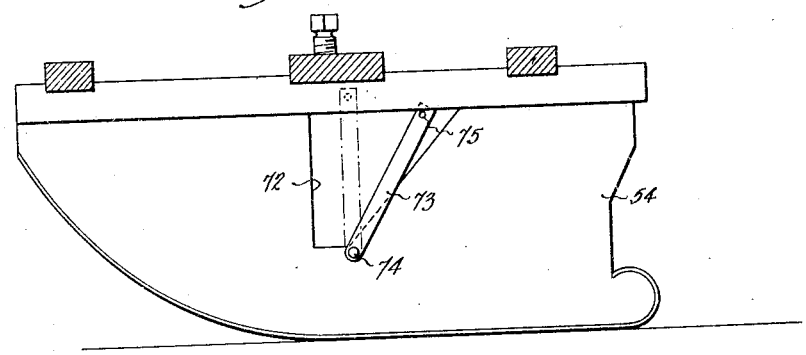
Figure 14 is a longitudinal section through another form of rear runner with the rear axle and other associated parts removed.

In the embodiment illustrated in Figure 14, the rear runner is of substantially the same construction as that described in connection with the embodiment shown in Figure 8 and includes the side members 54, each of which, instead of being provided with a slot 59 having vertical sides, is provided with an opening 72, which is of considerably greater width at its upper end so as to readily receive the axle housing 23, after which a lever 73 pivoted at 74 may be swung to the dotted line position and engaged in one of the grooves 61 formed in the block 60. The free end of the lever 73 is provided with an opening 75 for receiving any suitable fastening device to secure said lever in its vertical dotted line position.

Figure 15:
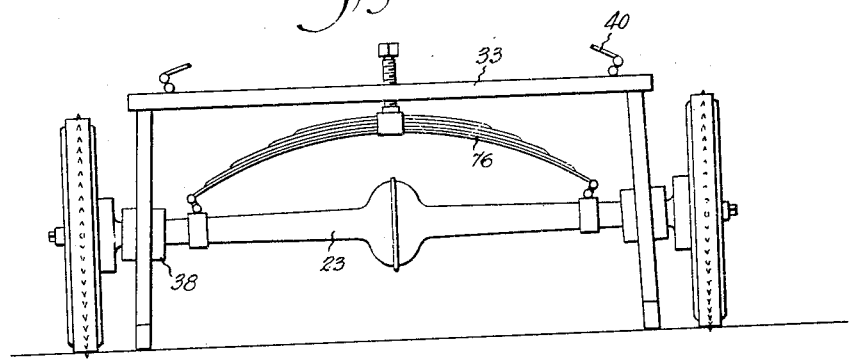
Figure 15 is a rear elevation of another form of the invention similar to that illustrated in Figure 2, but showing a different construction of spring mounting.
Figure 16:
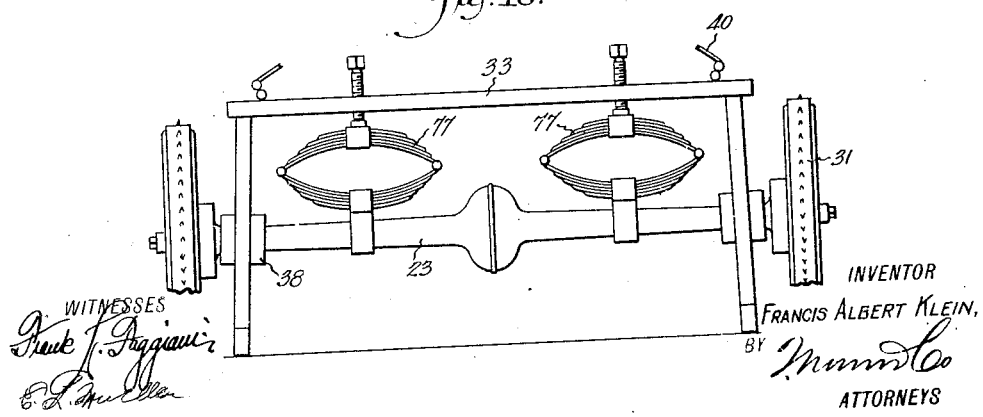
Figure 16 is a view similar to Figure 15 showing still another construction of spring mounting.

The constructions illustrated in Figures 15 and 16 are similar to that shown in Figure 2 and in addition thereto include, as in Figure 15, the single spring member 76 secured intermediate its ends to the frame 33 and having its ends attached to the axle housing 23. In Figure 16 two springs 77 of the full elliptical type are attached to the frame 33 and the housing 23.

What is claimed is:

1. The combination with the axle of a vehicle, of grooved blocks on the axle, a frame, runners carried by the frame and each having portions working in the grooves of the blocks, housings on the blocks, plates movable in the housings, springs in the housings and engaging the plates, said plates and spring serving to yieldingly support the runners, and screws mounted in the frame and engaging the said plates.

2. In a wheeled vehicle, the combination with an axle therefor; of a runner for the vehicle through which said axle extends and which has vertical movement relative to said axle, guide members carried by said axle and engageable with said runner, means carried by said guide members for yieldingly supporting said runner with respect to said axle, means cooperating with the last named means for vertically adjusting said runner, a lever pivoted to said runner adjacent the end of said axle, and a supporting member pivoted to the lever and engageable with said axle for maintaining said runner in an elevated position.

3. In a wheeled vehicle, the combination with an axle therefor; of a runner for the vehicle through which said axle extends and which has vertical movement relative to said axle, guide members carried by said axle and engageable with said runner, means carried by said guide members for yieldingly supporting said runner with respect to said axle, means cooperating with the last named means for vertically adjusting said runner, a lever pivoted to said runner adjacent the end of said axle, a supporting member pivoted to the lever and engageable with said axle for maintaining said runner in an elevated position, and means also carried by said runner and with which said levers are engaged to retain said supporting members in their operative positions.

FRANCIS ALBERT KLEIN.